(12) United States Patent
Timurdogan

(10) Patent No.: US 12,388,534 B2
(45) Date of Patent: Aug. 12, 2025

(54) CO-PACKAGED OPTICS SYSTEM WITH A LASER SOURCE AND A BI-DIRECTIONAL LASER MEDIUM

(71) Applicant: Lumentum Operations LLC, San Jose, CA (US)

(72) Inventor: Erman Timurdogan, Arlington, MA (US)

(73) Assignee: Lumentum Operations LLC, San Jose, CA (US)

( * ) Notice: Subject to any disclaimer, the term of this patent is extended or adjusted under 35 U.S.C. 154(b) by 238 days.

(21) Appl. No.: 18/193,915

(22) Filed: Mar. 31, 2023

(65) Prior Publication Data

US 2024/0195510 A1 Jun. 13, 2024

Related U.S. Application Data

(60) Provisional application No. 63/386,417, filed on Dec. 7, 2022.

(51) Int. Cl.
| | |
|---|---|
| *H04J 14/06* | (2006.01) |
| *H04B 10/50* | (2013.01) |
| *H04B 10/516* | (2013.01) |
| *H04B 10/54* | (2013.01) |

(52) U.S. Cl.
CPC ....... *H04B 10/5161* (2013.01); *H04B 10/503* (2013.01); *H04B 10/541* (2013.01); *H04J 14/06* (2013.01)

(58) Field of Classification Search
CPC .................................................... H04J 14/06
See application file for complete search history.

(56) References Cited

U.S. PATENT DOCUMENTS

2018/0217468 A1\* 8/2018 Wen ................. H04B 10/5561
2018/0375583 A1\* 12/2018 Wang ................. H04B 10/506
2020/0280372 A1\* 9/2020 Li ......................... H01S 5/0085
(Continued)

FOREIGN PATENT DOCUMENTS

WO 2022037511 A1 2/2022

OTHER PUBLICATIONS

S. Ardalan et al., "Bunch of Wires: An Open Die-to-Die Interface," 2020 IEEE Symposium on High-Performance Interconnects (HOTI), 2020, pp. 9-16.
(Continued)

*Primary Examiner* — Nathan M Cors
(74) *Attorney, Agent, or Firm* — Harrity & Harrity, LLP

(57) ABSTRACT

An optical system may include a laser source including a laser source output port; an electro-optic (EO) transmitter (Tx) including a Tx input port and a Tx output port; a first polarization splitter rotator (PSR) including a first port, a second port, and a third port; a second PSR including a fourth port, a fifth port, and a sixth port; and a polarization maintaining medium on an optical path between the second port and the fifth port. The laser source output port may be optically terminated at the first port. The second port may be optically terminated at the fifth port. The third port may be optically terminated at an output of the optical system. The Tx output port may be optically terminated at the fourth port. The fifth port may be optically terminated at the second port. The sixth port may be optically terminated at the Tx input port.

20 Claims, 11 Drawing Sheets

(56) References Cited

U.S. PATENT DOCUMENTS

2021/0341675 A1* 11/2021 Su .................. G02B 6/2766
2023/0121555 A1* 4/2023 Baehr-Jones .... H04B 10/50597
398/203

OTHER PUBLICATIONS

"Intel F-tile Architecture and PMA and FEC Direct PHY IP User Guide: 2.1.8. Embedded Multi-die Interconnect Bridge (EMIB)," https://www.intel.com/content/www/us/en/docs/programmable/683872/22-2-4-1-0/embedded-multi-die-interconnect-bridge-emib.html, Jan. 25, 2023, 21 pages.

\* cited by examiner

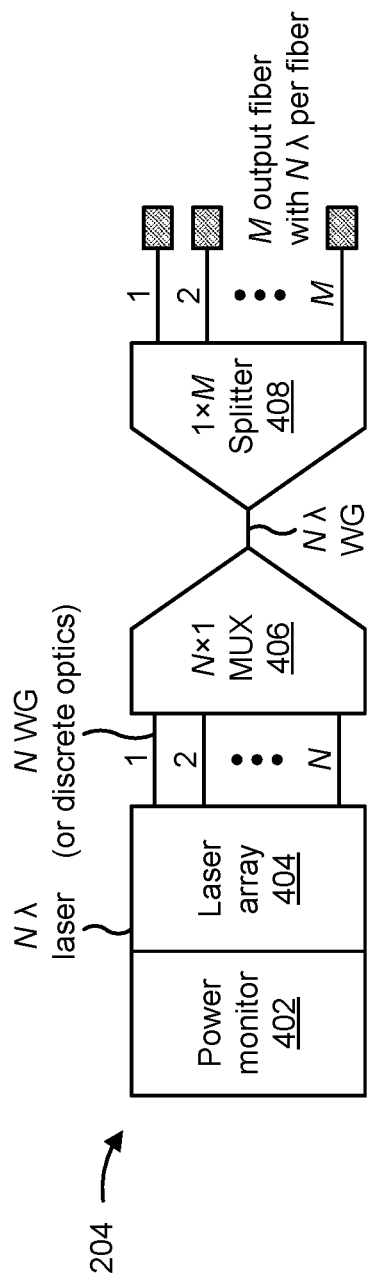
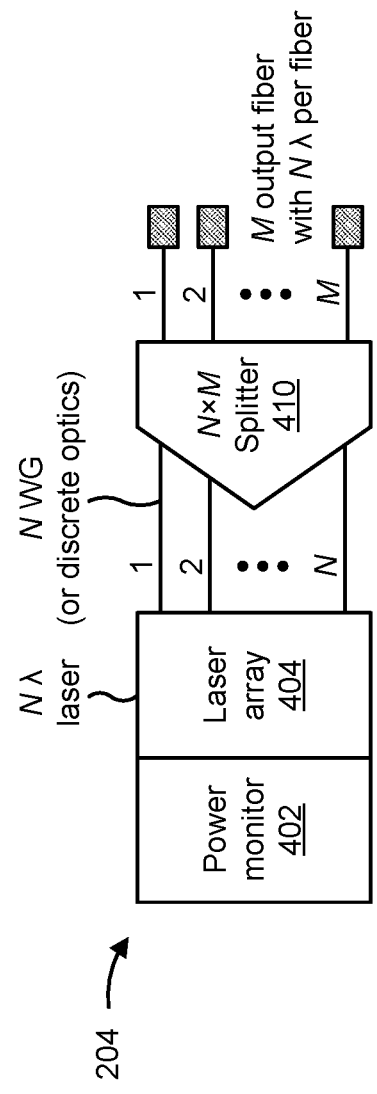
FIG. 4C
FIG. 4D

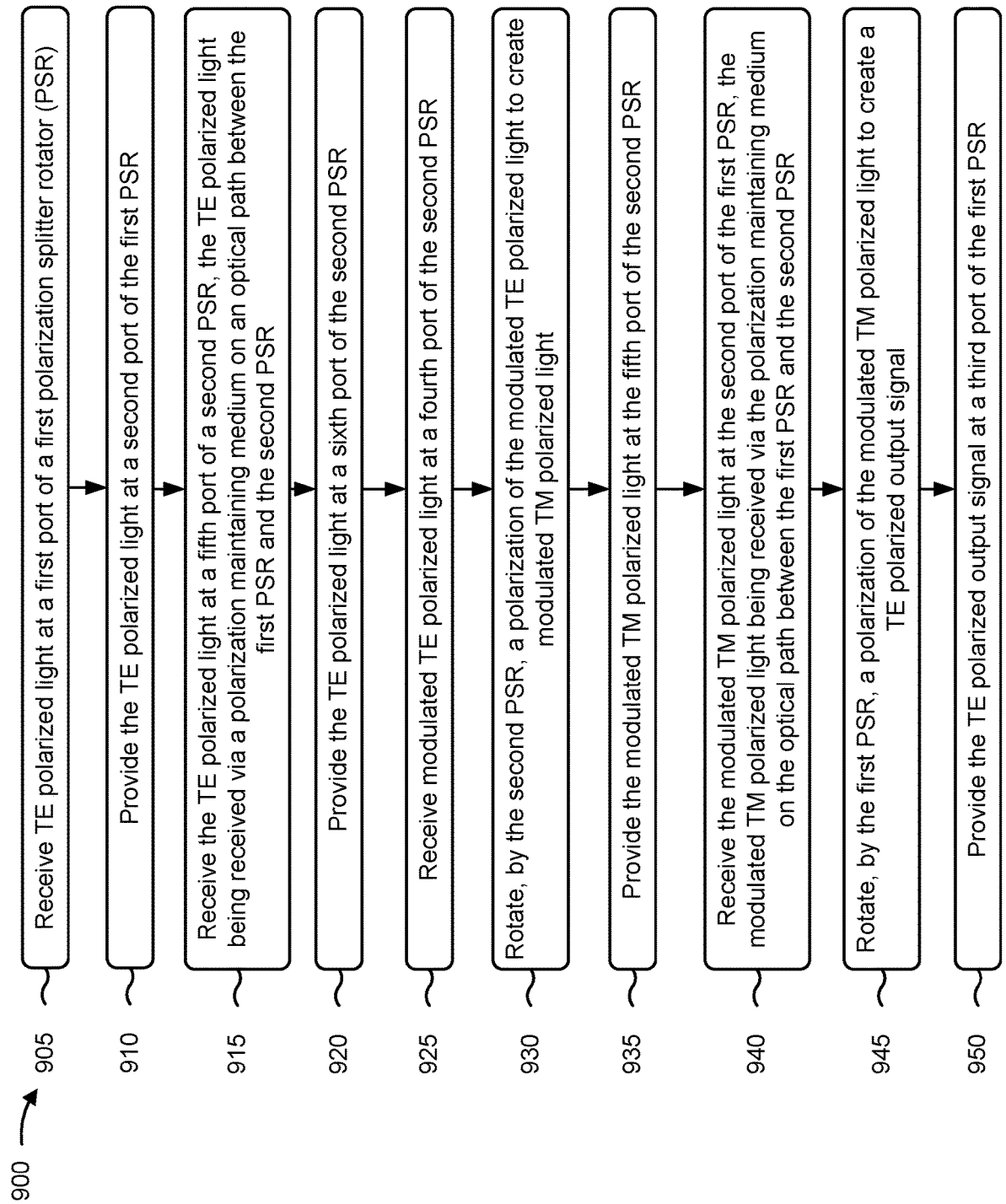

CO-PACKAGED OPTICS SYSTEM WITH A LASER SOURCE AND A BI-DIRECTIONAL LASER MEDIUM

CROSS-REFERENCE TO RELATED APPLICATION

This Patent Application claims priority to U.S. Provisional Patent Application No. 63/386,417, filed on Dec. 7, 2022, and entitled "RETROGRADE INJECTION OF OPTICAL CARRIERS FOR CO-PACKAGED OPTICS." The disclosure of the prior Application is considered part of and is incorporated by reference into this Patent Application.

TECHNICAL FIELD

The present disclosure relates generally to a co-packaged optics (CPO) system and, more particularly, a CPO system with a laser source and a bi-directional laser medium.

BACKGROUND

A conventional optical interconnect, also referred as a pluggable optical module (POM), is inserted at a faceplate of a device, such as a server, a top of rack switch, or a transport blade. The POM is then connected through an electrical edge connector at the faceplate of the device, through traces on a motherboard, to a processor (e.g., a central processing unit (CPU), a graphics processing unit (GPU), a switch application-specific integrated circuit (ASIC), a tensor processing unit (TPU), a neural processing unit (NPU), or the like). To address growing bandwidth demand, a data rate per connection (i.e., lane) has increased up to, for example, gigabits per second (Gbps) per lane, and is expected to continue increasing in the future (e.g., doubling every two to four years). Herein the terms "transverse-electric" (TE) and "transverse-magnetic" (TM) are not meant to be restrictive to any geometrically-specific orientations of the optical polarization, but are merely conventional means to refer to two mutually-orthogonal states of optical polarization. The component qualifiers "polarized", "polarization-splitting", and "polarization-maintaining" are terms used with respect to said TE and TM optical polarizations; therefore components with such qualifiers generally have some feature axis that should be aligned either parallel or orthogonal to the chosen "transverse" orientation; which is implied in the conventional usage of these terms.

SUMMARY

In some implementations, a co-packaged optics system includes a laser source including a laser source output port; electro-optic (EO) transmitter (Tx) including a Tx input port and a Tx output port; a first polarization splitter rotator (PSR) including a first port, a second port, and a third port; a second PSR including a fourth port, a fifth port, and a sixth port; and a polarization maintaining medium on an optical path between the second port of the first PSR and the fifth port of the second PSR, wherein the laser source output port is optically terminated at the first port of the first PSR, wherein the second port of the first PSR is optically terminated at the fifth port of the second PSR, wherein the third port of the first PSR is optically terminated at an output of the co-packaged optics system, wherein the Tx output port is optically terminated at the fourth port of the second PSR, wherein the fifth port of the second PSR is optically terminated at the second port of the first PSR, and wherein the sixth port of the second PSR is optically terminated at the Tx input port.

In some implementations, an optical system includes a laser source to provide an optical signal having a first polarization; a first polarization element to: receive the optical signal from the laser source and provide the optical signal to a second polarization element via a polarization maintaining medium, receive a second modulated optical signal from the second polarization element via the polarization maintaining medium, the second modulated optical signal having a second polarization, manipulate a polarization of the second modulated optical signal to create an output signal having the first polarization; provide the output signal to an output of the optical system; and the second polarization element to: receive the optical signal from the first polarization element via the polarization maintaining medium and provide the optical signal to a transmitter, receive a first modulated optical signal from the transmitter, the first modulated optical signal having the first polarization; manipulate a polarization of the first modulated optical signal to create the second modulated optical signal, and provide the second modulated optical signal to the first polarization element via the polarization maintaining medium.

In some implementations, a laser module includes a laser source; a polarization element including: a first port to receive an optical signal provided by the laser source, the optical signal having a first polarization; a second port to provide an output signal having the first polarization; a third port to: provide the optical signal received at the first port, wherein the optical signal is to be provided to a polarization maintaining medium, and receive a modulated optical signal having a second polarization, wherein the optical signal is to be received via the polarization maintaining medium; and a set of optical elements to manipulate a polarization of the modulated optical signal received at the third port to create the output signal provided at the second port.

In some implementations, a method includes receiving transverse-electric (TE) polarized light at a first port of a first PSR; providing the TE polarized light at a second port of the first PSR; receiving the TE polarized light at a fifth port of a second PSR, the TE polarized light being received via a polarization maintaining medium on an optical path between the first PSR and the second PSR; providing the TE polarized light at a sixth port of the second PSR; receiving modulated TE polarized light at a fourth port of the second PSR; rotating, by the second PSR, a polarization of the modulated TE polarized light to create modulated transverse-magnetic (TM) polarized light; providing the modulated TM polarized light at the fifth port of the second PSR; receiving the modulated TM polarized light at the second port of the first PSR, the modulated TM polarized light being received via the polarization maintaining medium on the optical path between the first PSR and the second PSR; rotating, by the first PSR, a polarization of the modulated TM polarized light to create a TE polarized output signal; and providing the TE polarized output signal at a third port of the first PSR.

BRIEF DESCRIPTION OF THE DRAWINGS

FIGS. 4A-4D are diagrams illustrating example implementations of the laser source of the CPO system.

FIG. 9 is a flowchart of an example process associated with a CPO system described herein.

DETAILED DESCRIPTION

The following detailed description of example implementations refers to the accompanying drawings. The same reference numbers in different drawings may identify the same or similar elements.

At a high data rate, such as Gbps and higher, electronic signal interconnects over motherboard traces and package and electrical connectors of a device (e.g., a server, a top of rack switch, a transport blade, or the like) introduce significant radio frequency (RF) losses. These RF losses can in some cases be alleviated with strong digital signal processor (DSP) equalization. However, such DSP equalization comes at the expense of key metrics such as cost, power, and latency. Further, on-board retimers and expensive RF cabling are required for long, fanned-out motherboard traces. As a result, cost, power consumption, and latency are increased. To address this challenge, a co-packaged optics (CPO) system can be used to bring optical signal interconnects (e.g., optics included in a POM) into the same package with a processor, thereby replacing certain lossy RF traces, need for heavy equalization, and other peripherals.

While a high bit rate connection with the processor can be achieved by a single pair of RF connections, an alternative is to use parallel low-speed RF in-package connections (e.g., embedded multi-die interconnect bridge (EMIB), bunch of wires (BOW), universal chiplet interconnect express (UCIe), or the like) and gearbox (i.e., multiplex) up to the desired rate in a driver/receiver integrated circuit. This internal gearbox reduces energy consumption by enabling the use of lumped-element capacitive devices that have a compact footprint. These devices can be, for example, silicon photonics micro-ring modulators or segmented/short/lumped-element Mach-Zehnder (MZ) modulators (rather than travelling wave terminated MZ modulators). These solutions can be used for applications for digital RF beam-forming radars, artificial intelligence (AI) and machine learning (ML) clusters, or high-performance computing (HPC) communication standards (e.g., InfiniBand). Overall, these improvements require a CPO solution to be packaged together with processors, and introduce problems such as meeting a bandwidth density of processors (e.g., both one-dimensional (1D)/shoreline and two-dimensional (2D)/area) and operating with high reliability at high temperatures. Both requirements lead to the development of separating transmitter and receiver optics from a laser source. The laser source may in some cases be referred to as an external laser/light source (ELS) or a remote laser/light source.

However, such a solution requires additional laser fibers to be attached to the transmitter, which expands a footprint of the device, limits bandwidth density, and reduces reliability of the device (e.g., by adding additional interfaces).

Figure 1:
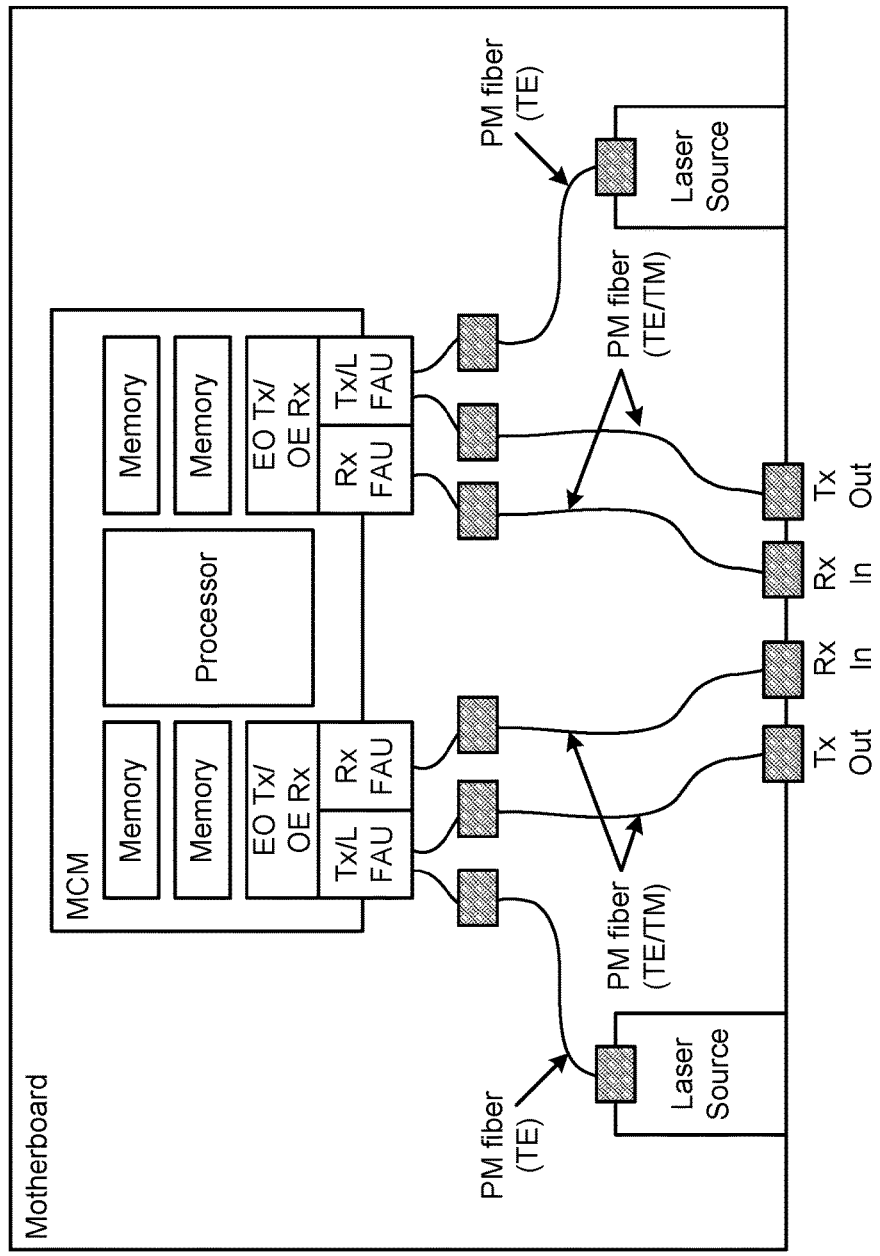
FIG. 1 is a diagram illustrating an example of a conventional co-packaged optics (CPO) system.

FIG. 1 is a diagram illustrating an example of a conventional CPO system 100. As shown in FIG. 1, the conventional CPO system includes a motherboard on which two laser sources and a multi-chip module (MCM) are connected. As shown, the MCM includes a processor, one or more memories, two electro-optic transmitters (EO Txs), and two opto-electric receivers (OE Rxs) with a given EO Tx/OE Rx pair being located on the same chip. As further shown, the CPO system includes two transmitter/laser fiber array units (Tx/L FAUs) to couple light from/to the EO Txs, and two receiver fiber array units (Rx FAUs) to couple light to the OE Rxs. An optical connection between a given laser source and an associated EO Tx is provided via a series of connectors (e.g., one or more multi-fiber push-on (MPO) connectors) and polarization maintaining (PM) fibers. Similarly, an optical connection between a given EO Tx and an associated Tx output is provided via a series of connectors and PM fibers. Further, an optical connection between a given OE Rx and an associated Rx input is provided via a series of connectors and PM fibers.

In practice, an architecture of the laser source depends on needs of the EO Tx(s) and the OE Rx(s). There are a variety of possible laser source architectures, and use of a given laser source architecture may depend on, for example, a quantity of wavelengths, a power per wavelength, an eye safety requirement in an output fiber, or the like, as defined in a given application. Given the variety of possible laser source architectures, there are a variety of possible architectures for the EO Tx(s) and the OE Rx(s), which may include one or more on-chip multiplexers, demultiplexers, or power splitters (e.g., that enable laser power to be shared among multiple modulators), and may provide polarization multiplexing at an output.

Although there are many permutations of the above-described implementations, what is common is that there are laser input fibers, transmit fibers, and receiver fibers at an interface of the CPO package. If these fibers are edge coupled or vertically coupled to optics (e.g., a silicon photonics integrated circuit Tx/Rx) in a 1D arrangement, then the shoreline bandwidth density of optics is limited by a fiber pitch, a quantity of fibers required per transceiver, a quantity of wavelengths per fiber, and a bandwidth per fiber.

As one example, a processor with 25 Gbps signaling with four layers of ground-signal pattern at a bump pitch (electrical interface grid) of 36 microns (µm) or 50 µm has a shoreline density of 0.92 terabits per second per millimeter (Tbps/mm) or 0.66 Tbps/mm, respectively, which requires a 127 µm fiber pitch and shared laser or polarization multiplexed transmit outputs. Recalling FIG. 1, these fibers will breakout inside a chassis and will be polarization-maintaining in many cases, which increases cost and limits serviceability of the device. Notably, a requirement for shoreline density is expected to double over time (e.g., every 24 to 48 months in datacenter/HPC ASICs or every 12 to 18 months for AI/ML cluster ASICs). Given these requirements and observations, reducing a quantity of fibers in the CPO package is a critical parameter for enabling scalability of CPO packages.

Some implementations described herein provide a CPO system with a laser source and a bi-directional laser medium. In some implementations, the CPO system includes a laser source including a laser source output port and an EO Tx including a Tx input port and a Tx output port. The optical system further includes a first polarization splitter rotator (PSR) including a plurality of ports and a second PSR including a plurality of ports. The optical system further includes a polarization maintaining medium on an optical path between a port of the first PSR and a port of the second PSR. In some implementations, the CPO system enables a laser fiber and a Tx fiber to be combined into one fiber such that flow on an optical path between the laser and the EO Tx is bi-directional. Therefore, the CPO system described herein reduces a quantity of fibers needed in the CPO system, thereby reducing cost and increasing shoreline density (e.g., as compared to a conventional CPO system). Further, the CPO system described herein reduces a quantity of fiber breakouts and routing inside a chassis of the CPO system, thereby reducing cost and complexity of the CPO system. Additional details are provided below.

Figure 2:
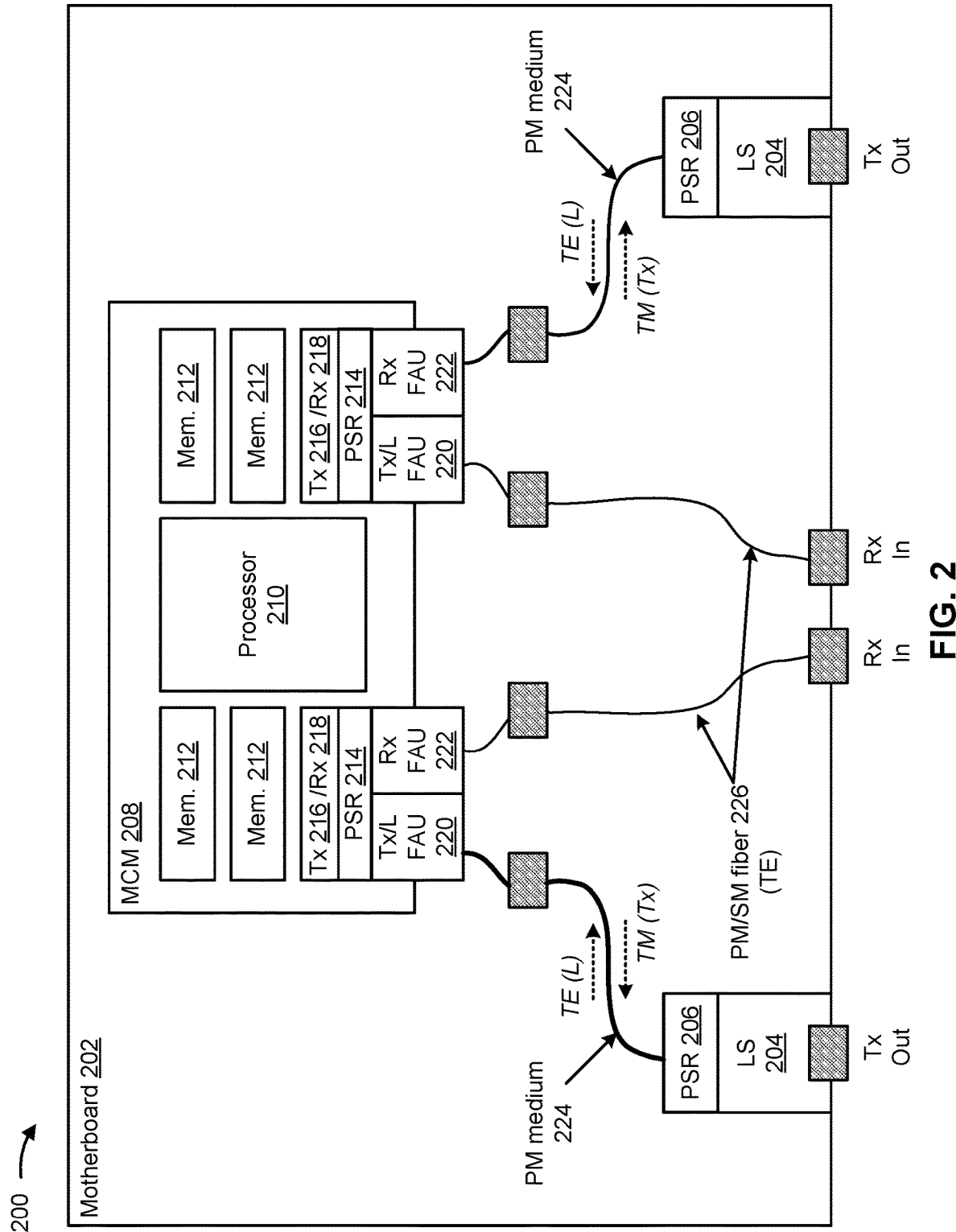
FIG. 2 is a diagram illustrating an example of a CPO system including a laser source and a bi-directional laser medium.

FIG. 2 is a diagram illustrating an example of a CPO system 200 including a laser source and a bi-directional laser medium. As shown in FIG. 2, the CPO system 200 may include a motherboard 202 on which one or more laser sources 204 (e.g., two laser sources 204) and an MCM 208 are connected. As shown, the MCM 208 may include a processor 210, one or more memories 212, one or more EO Txs 216 (e.g., two EO Txs 216), and one or more OE Rxs 218 (e.g., two OE Rxs 218). In some implementations, a given EO Tx 216 and OE Rx 218 pair may be located on the same chip, as indicated in FIG. 2. As further shown, the CPO system 200 may include one or more Tx/L FAUs 220 to couple light from/to the EO Txs 216, and one or more Rx FAUs 222 to couple light to the OE Rxs 218. An optical connection between a given laser source 204 and an associated EO Tx 216 is provided via a series of connectors (e.g., one or more MPO connectors, indicated by shaded rectangles in FIG. 2) and one or more PM mediums 224 (e.g., one or more PM fibers). Further, an optical connection between a given OE Rx 218 and an associated Rx input may be provided via a series of connectors and PM fibers 226.

As further shown, the CPO system 200 includes a PSR 206 and a PSR 214. A PSR (e.g., the PSR 206, the PSR 214) is an optical component capable of performing polarization splitting and/or polarization rotating on an optical signal. "Polarization splitting" refers to the separation of an optical signal to create two optical signals including light with orthogonal polarizations. For example, the PSR may be capable of separating an optical signal to create a transverse electric (TE) polarized optical signal and a transverse magnetic (TM) polarized optical signal. "Polarization rotating" refers to rotation of a polarization axis of a (linearly) polarized optical signal by some angle. For example, the PSR may be capable of rotating a polarization axis of a TE polarized optical signal to create a TM polarized optical signal, or may be capable of rotating a polarization axis of a TM polarized optical signal to create a TE polarized optical signal. In general, a PSR bidirectionally interfaces a pair of optical signal polarizations (either of which may be absent) between: (a) on one side being at the same position (port) and having distinct orientations; and (b) on the opposing side being at distinct positions (ports) and having equivalent orientations.

In some implementations, as illustrated in the CPO system 200, the PSR 206 and the PSR 214 are on an optical path between the laser source 204 and the Tx 216. That is, in some implementations, the PSR 206 and the PSR 214 are arranged such that light propagating from the laser source 204 to the Tx 216 passes through the PSR 206 and the PSR 214, and such that light propagating from the Tx 216 to the laser source 204 passes through the PSR 214 and the PSR 206. In some implementations, the PSR 206 may be included in the laser source 204 (e.g., the PSR 206 and the laser source 204 may be integrated on the same chip or in the same package). Alternatively, the PSR 206 may be separate from the laser source 204. In some implementations, the PSR 214 may be included in the Tx 216 (e.g., the PSR 214 and the Tx 216 may be integrated on the same chip or in the same package). Alternatively, the PSR 214 may be separate from the Tx 216. Notably, the PSR 206 and the PSR 214 may be used in the CPO system 200 because the PSR 206 and the PSR 214 can be integrated into a silicon photonics platform with performance matching to discrete counterparts, which is not the case for other types of components that could enable bi-directional operation as described herein, such as a reflective modulator and a circulator.

In the CPO system 200, the PSR 206 and the PSR 214 enable a laser medium (e.g., a fiber associated with providing light from the laser source 204 toward the Tx 216) and a Tx medium (e.g., a fiber associated with providing light from the Tx 216 toward the laser source 204) to be combined into a single medium (e.g., a single PM fiber) by providing an optical signal output by the laser source 204 to the Tx 216 as uplink and providing an optical signal output by the Tx 216 toward the laser source 204 as downlink. Thus, the PSR 206 and the PSR 214 may enable light to propagate in both directions (i.e., bi-directionally) between the laser source 204 and the Tx 216 in the same medium (e.g., in the same PM medium 224). In this way, the CPO system 200 reduces a quantity of fibers, thereby reducing cost and increasing shoreline density (e.g., as compared to a conventional CPO system). Further, the CPO system 200 reduces a quantity of fiber breakouts and routing inside a chassis, thereby reducing cost and complexity (e.g., as compared to a conventional CPO system). The CPO system 200 differs from the conventional CPO system in that a laser fiber and Tx fiber are separate fibers, each carrying light propagating in a single direction (e.g., uplink or downlink).

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more functions described as being performed by another set of components shown in FIG. 2.

Figure 3:
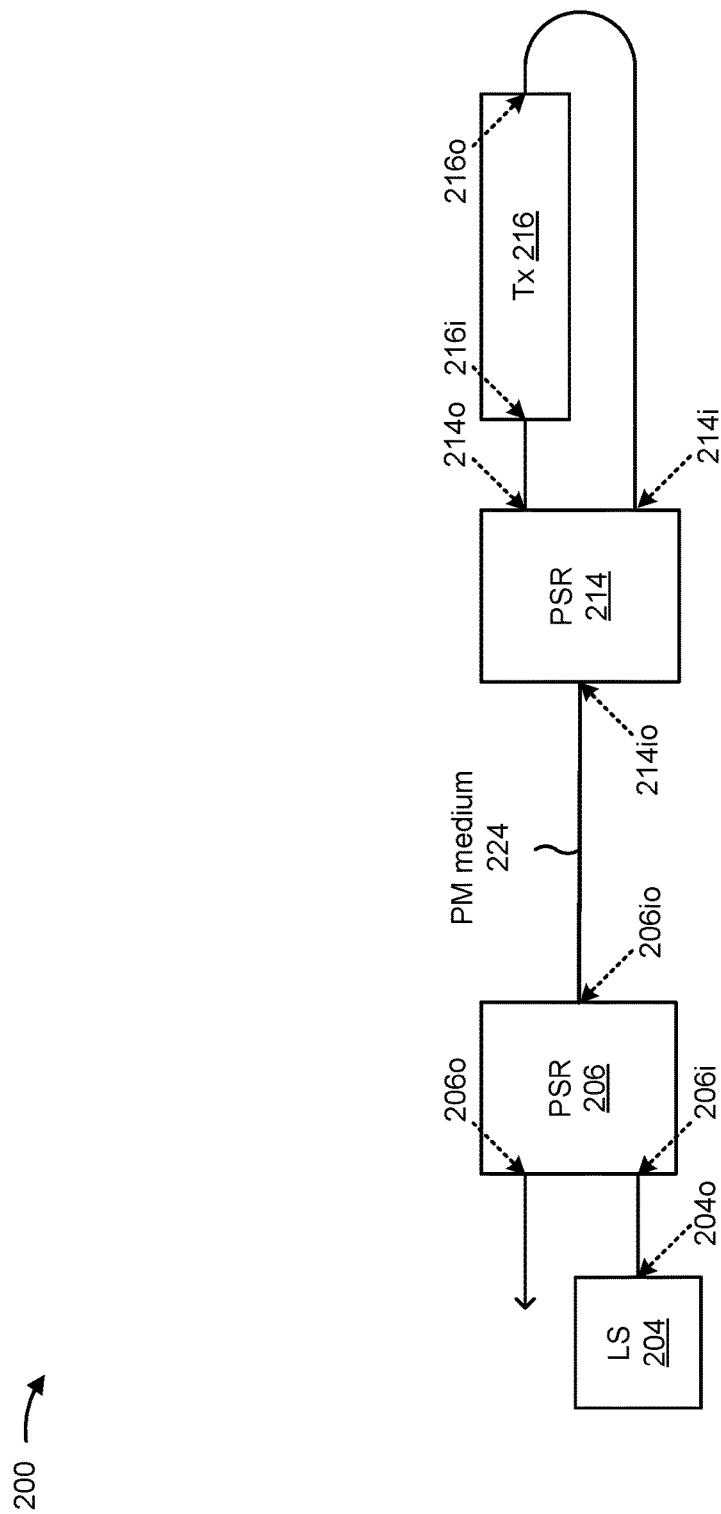
FIG. 3 is a diagram illustrating an example of implementation of a laser source, a first polarization splitter rotator (PSR), a second PSR, and a transmitter of the CPO system shown in FIG. 2.

FIG. 3 is a diagram illustrating an example of implementation of the laser source 204, the PSR 206, the PSR 214, and the Tx 216 of the CPO system 200 shown in FIG. 2. As shown in FIG. 3, the laser source 204 includes a laser source output port 204o and the Tx 216 includes a Tx input port 216i and a Tx output port 216o. As further shown, the PSR 206 includes a first port 206i, a second port 206io, and a third port 206o, and the PSR 214 includes a fourth port 214i, a fifth port 214io, and a sixth port 214o.

In some implementations, as shown in FIG. 3, the PM medium 224 is on an optical path between the second port 206io of the PSR 206 and the fifth port 214io of the PSR 214. In some implementations, the PM medium 224 includes one or more optical components (e.g., one or more optical fibers) designed to maintain a polarization of light propagating along the PM medium 224.

In some implementations, the laser source output port 204o is optically terminated at the first port 206i of the PSR 206. In some implementations, the second port 206io of the PSR 206 is optically terminated at the fifth port 214io of the PSR 214. In some implementations, the third port 206o of the PSR 206 is optically terminated at an output of the CPO system 200 (not shown). In some implementations, the Tx output port 216o is optically terminated at the fourth port 214i of the PSR 214. In some implementations, the fifth port 214io of the PSR 214 is optically terminated at the second port 206io of the PSR 206. In some implementations, the sixth port 214o of the PSR 214 is optically terminated at the Tx input port 216i.

In an example operation of the CPO system 200 shown in FIG. 3, the laser source 204 provides an optical signal having a first polarization (e.g., a TE polarized optical signal). Here, the laser source 204 provides the optical signal via the laser source output port 204o such that the optical signal is coupled to the first port 206i of the PSR 206.

The PSR 206 receives the optical signal from the laser source 204 and provides the optical signal to the PSR 214 via the PM medium 224. Here, the PSR 206 provides the optical signal via the second port 206io such that the optical signal is coupled to the fifth port 214io.

The PSR 214 receives the optical signal from the PSR 206 via the PM medium 224 and provides the optical signal to the Tx 216. Here, the PSR 214 provides the optical signal via the sixth port 214o such that the optical signal is coupled to the Tx input port 216i.

The Tx 216 receives the optical signal provided by the PSR 214, modulates the optical signal to create a first modulated optical signal having the first polarization (e.g., a TE polarized modulated optical signal), and provides the first modulated optical signal to the PSR 214. Here, the Tx 216 provides the first modulated optical signal via the Tx output port 216o such that the first modulated optical signal is coupled to the fourth port 214i.

The PSR 214 receives the first modulated optical signal from the Tx 216, manipulates (e.g., rotates) a polarization of the first modulated optical signal to create a second modulated optical signal (e.g., a TM polarized modulated optical signal), and provides the second modulated optical signal to the PSR 206 via the PM medium 224. Here, the PSR 214 provides the second modulated optical signal via the fifth port 214io such that the second modulated optical signal is coupled to the second port 206io.

The PSR 206 receives the second modulated optical signal from the PSR 214 via the PM 224, manipulates a polarization of the second modulated optical signal to create an output signal having the first polarization (e.g., a TE polarized output signal), and provides the output signal to an output of CPO system 200. Here, the PSR 206 provides the output signal via the third port 206o such that the output signal is coupled to the output of the CPO system 200.

In practice, the operation enabled by the CPO system 200 shown in FIG. 3 eliminates a need for a non-reciprocal medium (e.g., such as a circulator) and can be fabricated using readily integrated components such as PSRs, MZ modulators, or micro-ring modulators. Further, the CPO system 200 shown in FIG. 3 provides flexibility so as to enable multi-wavelength solutions required in some applications (e.g., datacenter/HPC or AI/ML architectures), while increasing shoreline density.

As indicated above, FIG. 3 is provided as an example. Other examples may differ from what is described with regard to FIG. 3. The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

FIGS. 4A-4D are diagrams illustrating example implementations of the laser source 204. In some implementations, the laser source 204 may be, for example, a single wavelength continuous wave (CW) laser source, a multi-wavelength single output CW laser source, or a multi-wavelength multi-output CW laser source. In some implementations, the laser source 204 may be configured to generate N (N≥1) wavelengths (λ) of light, and may provide one or more of the N wavelengths via M (M≥1) output fibers. In practice, the quantity N and the quantity M are independent of one another. In some implementations, N may be in a range from, for example, 1 to 32. In some implementations, M may be in a range from, for example, 1 to 32.

Figure 4A:
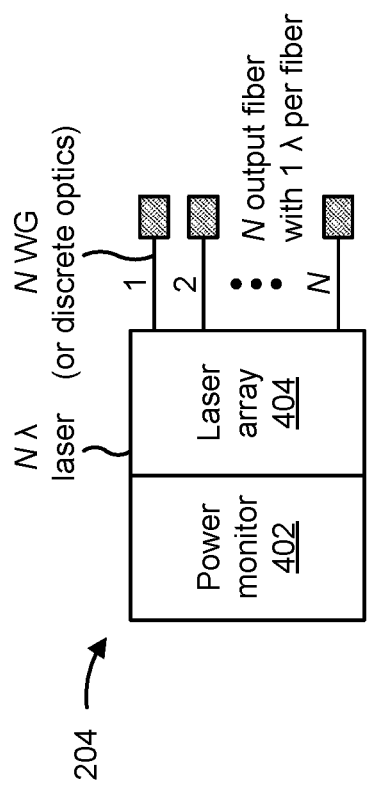

FIG. 4A illustrates a first example implementation of the laser source 204. As shown in FIG. 4A, the laser source 204 may include a power monitor 402, a laser array 404 to generate N wavelengths of light, and N output fibers. Here, each of the N output fibers may carry one of the N wavelengths of light (e.g., such that one wavelength is provided via each of the N output fibers). In the example shown in FIG. 4A, N is equal to M. In some implementations, the laser source 204 shown in FIG. 4A may be a single wavelength high power CW laser (e.g., when N=M=1).

Figure 4B:
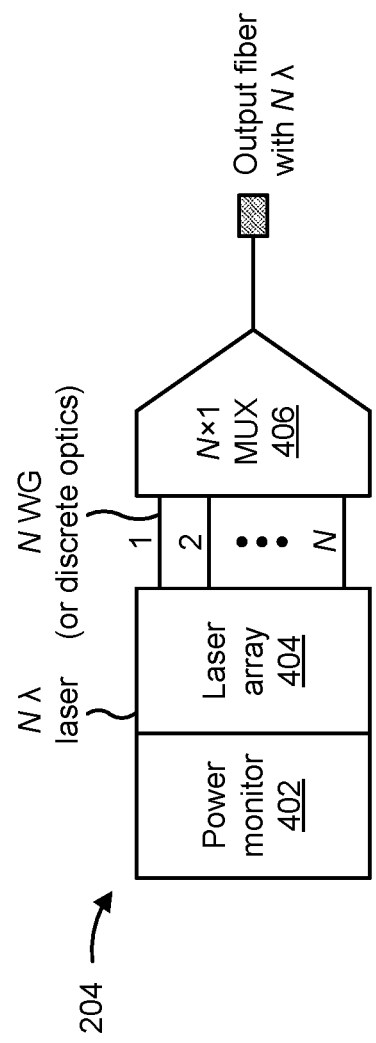

FIG. 4B illustrates a second example implementation of the laser source 204. As shown in FIG. 4B, the laser source 204 may include a power monitor 402, a laser array 404 to generate N wavelengths of light, an N×1 multiplexer (MUX) 406, and a single output fiber (e.g., M=1). Here the output fiber may carry N wavelengths of light. The laser source 204 shown in FIG. 4B may be, for example, a multi-wavelength coarse wavelength division multiplexed (CWDM) or dense wavelength division multiplexed (DWDM) single output CW laser source.

FIG. 4C illustrates a third example implementation of the laser source 204. As shown in FIG. 4C, the laser source 204 may include a power monitor 402, a laser array 404 to generate N wavelengths of light, an N×1 MUX 406, a 1×M splitter 408, and M output fibers. Here, each of the M output fibers may carry N wavelengths of light. The laser source 204 shown in FIG. 4C may be, for example, a multi-wavelength CWDM or DWDM multi-output CW laser source.

FIG. 4D illustrates a fourth example implementation of the laser source 204. As shown in FIG. 4D, the laser source 204 may include a power monitor 402, a laser array 404 to generate N wavelengths of light, an N×M broadband splitter 410, and M output fibers. Here, each of the M output fibers may carry N wavelengths of light. The laser source 204 shown in FIG. 4D may be, for example, a multi-wavelength CWDM or DWDM multi-output CW laser source.

As indicated above, FIGS. 4A-4D is provided as examples. Other examples may differ from what is described with regard to FIGS. 4A-4D. The number and arrangement of components shown in FIGS. 4A-4D are provided as an example. In practice, there may be additional components, fewer components, different components, or differently arranged components than those shown in FIGS. 4A-4D. Furthermore, two or more components shown in FIGS. 4A-4D may be implemented within a single component, or a single component shown in FIGS. 4A-4D may be implemented as multiple, distributed components. Additionally, or alternatively, a set of components (e.g., one or more components) shown in FIGS. 4A-4D may perform one or more functions described as being performed by another set of components shown in FIGS. 4A-4D.

Figure 5:
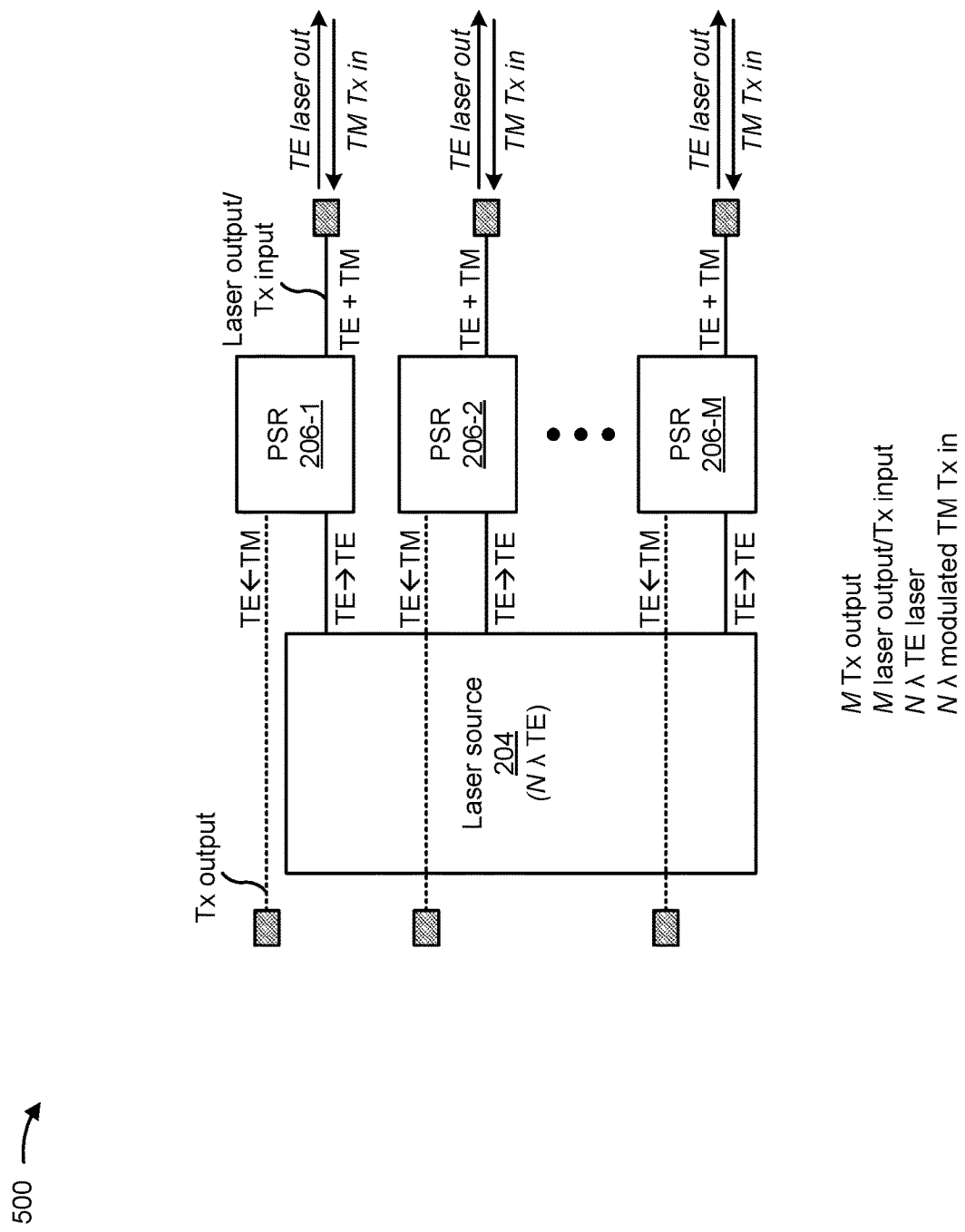
FIG. 5 is a diagram illustrating an example implementation of a laser source and a set of PSRs in the CPO system.

FIG. 5 is a diagram illustrating an example implementation 500 of a laser source 204 and a set of M PSRs 206 (e.g., PSR 206-1 through PSR 206-M) in the CPO system 200. In some implementations, the laser source 204 shown in FIG. 5 may have an architecture as illustrated in any of FIGS. 4A-4D. The set of PSRs 206 enable bi-directional laser output and Tx input, as described herein.

As shown by FIG. 5, in one example, the laser source 204 may generate N wavelengths of TE polarized light (e.g., the laser source 204 is an N λ TE laser). The laser source 204 provides a TE polarized optical signal to each of the M PSRs 206. Here, a given TE polarized optical signal may include one or more of the N wavelengths of light (e.g., depending on an architecture of the laser source 204). A given PSR 206 receives a corresponding one of the M TE polarized optical signals and provides a TE polarized optical signal (identified as "TE laser out" in FIG. 5) via a corresponding bi-directional laser output/Tx input. Thus, as indicated in FIG. 5, the CPO system 200 may include M laser outputs/Tx inputs. In some implementations, a medium via which the TE polarized optical signal is provided (and via which a TM polarized modulated optical signal is received, as described below) comprises a PM medium 224.

As further shown, the given PSR 206 is configured to receive a corresponding one of M TM polarized modulated optical signals (identified as "TM Tx in" in FIG. 5)) via the same bi-directional laser output/Tx input. Here, the TM polarized modulated optical signal may include the one or more of the N wavelengths of light. The TM polarized modulated optical signal is provided to the PSR 206 by a PSR 214 after modulation of the TE polarized optical signal by a Tx 216 (e.g., as described with respect to FIGS. 6A and 6B). The PSR 206 receives the TM polarized modulated optical signal, performs polarization splitting to separate the TM polarized modulated optical signal from TE polarized light propagating through the PSR, and manipulates a polarization of the TM polarized modulated optical signal to create a TE polarized output signal. The PSR 206 then provides the TE polarized output signal via a corresponding one of M Tx outputs of the CPO system 200.

As indicated above, FIG. 5 is provided as an example. Other examples may differ from what is described with regard to FIG. 5. The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6A:
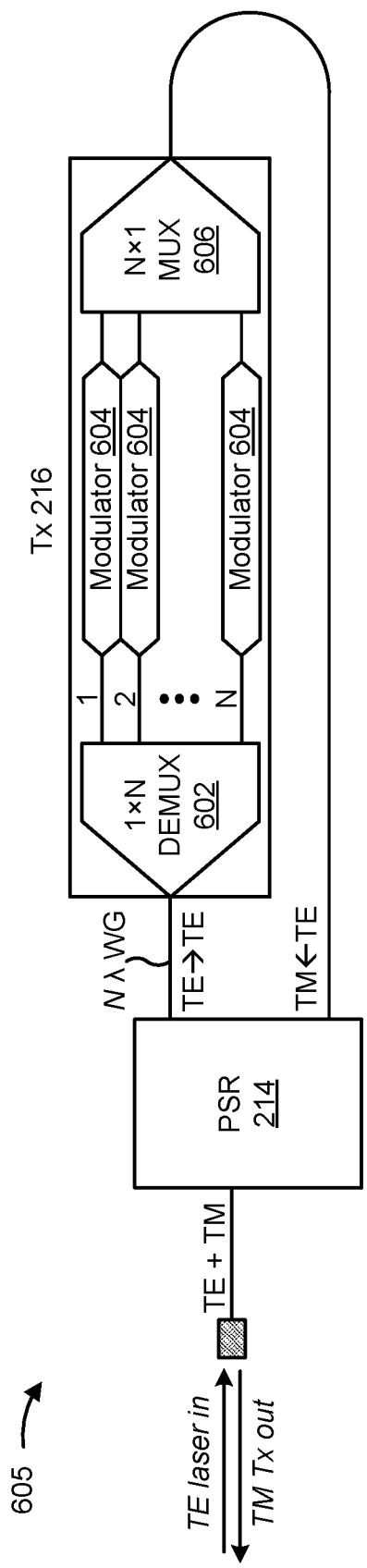
FIGS. 6A and 6B are diagrams illustrating example implementations of a PSR and a transmitter in the CPO system.
Figure 6B:
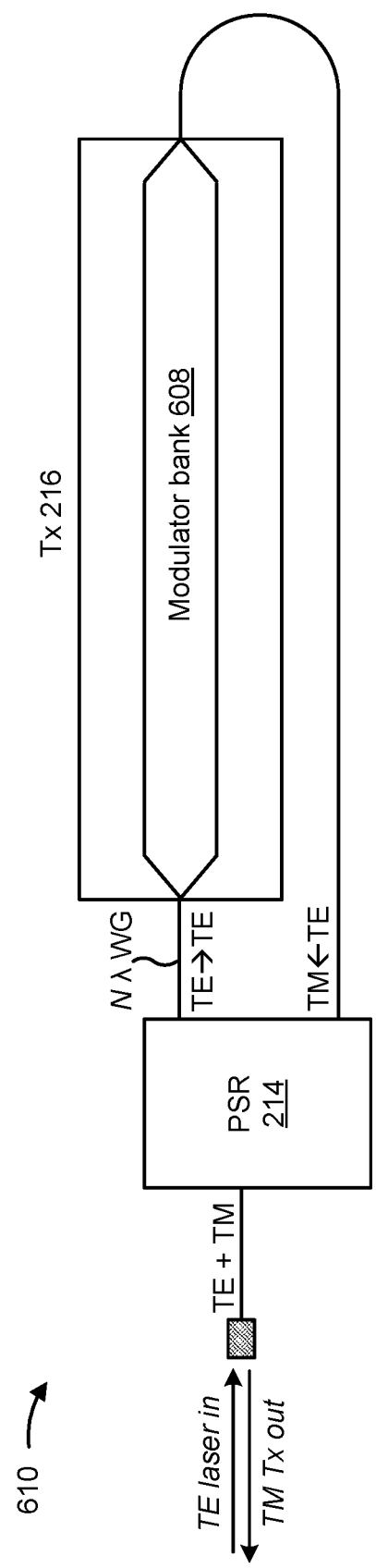

FIGS. 6A and 6B are diagrams illustrating example implementations 605 and 610, respectively, of a PSR 214 and a Tx 216 in the CPO system 200. In some implementations, the PSR 214 is one of a set of M PSRs 214, where each of the M PSRs 214 is connected to a corresponding PSR 206 of a set of M PSRs 206 via the PM medium 224 (e.g., as described with respect to FIG. 5). Thus, the CPO system 200 may in some implementations include M PSRs 214 and M Txs 216. The set of PSRs 214 enable bi-directional laser output and Tx input, as described herein.

As described with respect to FIG. 5, a PSR 214 may receive a TE polarized optical signal (identified as "TE laser in" in FIGS. 6A and 6B) from the PSR 206 via a bi-directional laser output/Tx input (e.g., via a PM medium 224). As shown in FIGS. 6A and 6B, the PSR 214 provides the TE polarized optical signal to the Tx 216. In some implementations, the Tx 216 may be a WDM or a single CW transmitter that uses a single laser fiber input and includes a 1×N demultiplexer (DEMUX) 602, a set of N TE modulators 604, and an N×1 MUX 606, an example of which is shown in FIG. 6A. In some implementations, the Tx 216 may be a WDM or a single CW transmitter that uses a single laser fiber input and includes a modulator bank 608 for the TE polarization, an example of which is shown in FIG. 6B. In some implementations, the modulator bank 608 may be, for example, a ring-resonator-based modulator bank or a Mach-Zehnder modulator bank. In some implementations, the Tx 216 modulates the TE polarized optical signal to create a TE polarized modulated optical signal, and provides the TE polarized modulated optical signal to the PSR 214.

The PSR 214 receives the TE polarized modulated optical signal and manipulates a polarization of the TE polarized modulated optical signal to create a TM polarized output signal. The PSR 214 then provides the TM polarized modulated optical signals (identified as "TM Tx out" in FIGS. 6A and 6B) via the same bi-directional laser output/Tx input. Here, the TM polarized modulated optical signal may include the one or more of the N wavelengths of light.

As indicated above, FIGS. 6A and 6B is provided as examples. Other examples may differ from what is described with regard to FIGS. 6A and 6B. The number and arrangement of components shown in FIGS. 6A and 6B are provided as an example. In practice, there may be additional components, fewer components, different components, or differently arranged components than those shown in FIGS. 6A and 6B. Furthermore, two or more components shown in FIGS. 6A and 6B may be implemented within a single component, or a single component shown in FIGS. 6A and 6B may be implemented as multiple, distributed components. Additionally, or alternatively, a set of components (e.g., one or more components) shown in FIGS. 6A and 6B may perform one or more functions described as being performed by another set of components shown in FIGS. 6A and 6B.

Figure 7:
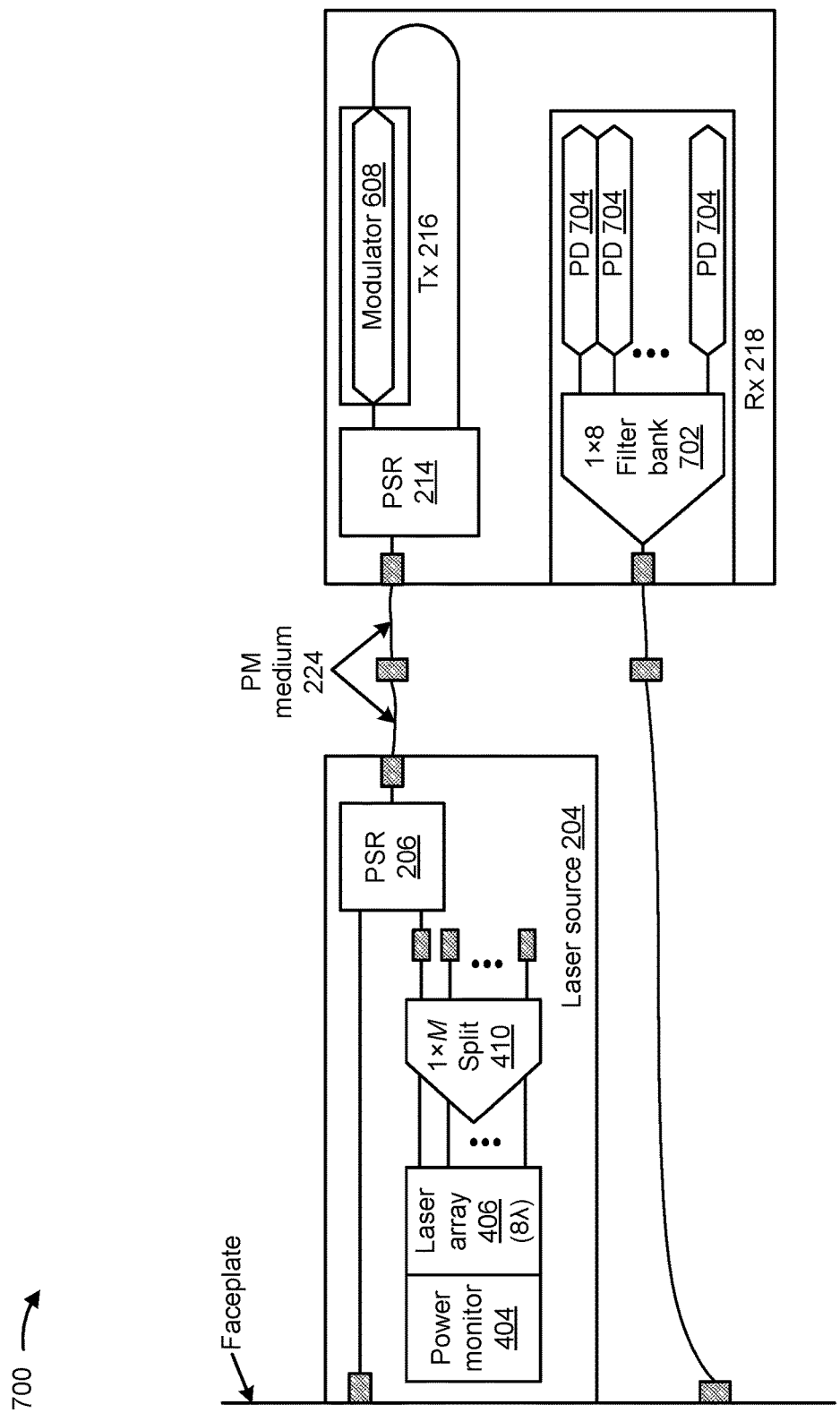
FIG. 7 is a diagram of an example implementation of the CPO system, described herein.

FIG. 7 is a diagram of an example implementation 700 of the CPO system 200. Example implementation 700 illustrates an example of a bi-directional CPO transceiver architecture that may be used with 8 wavelength channels (e.g., N=8). In some implementations, as shown in FIG. 7, the Tx 216 and the Rx 218 may be included in an MCM 208 (e.g., on a same chip). For purposes of clarity, only one of M transceivers (e.g., one Tx 216/Rx 218 pair) is shown in FIG. 7. In some implementations, the Rx 218 is capable of converting an input optical signal (e.g., received by the CPO system 200) to an electrical signal. In practice, the example implementation 700 may include multiple PSRs 206, multiple PSRs 214, and multiple transceivers that each use a corresponding output fiber (i.e., M may be greater than 1). In the example implementation 700, the Rx 218 includes a 1×8 ring resonator filter bank and eight photodetectors (PDs) 704; however, other implementations for the Rx 218 may be used.

As indicated above, FIG. 7 is provided as an example. Other examples may differ from what is described with regard to FIG. 7.

In practice, limitations of the CPO system 200 are (1) polarization separation between the optical signal generated by the laser source 204 and the output optical signal, (2) photonic components (e.g., PSRs 206 and PSRs 214) being added to the laser source 204 and to a photonic integrated circuit (PIC) of the Tx 216, and (3) the use of single polarization for transmission and a single fiber laser input per output.

Polarization separation between the optical signal generated by the laser source 204 and the output optical signal is related to polarization extinction ratio and crosstalk of the PSRs 206 and 214, waveguide-to-fiber couplers in the CPO system 200, and PM fibers in the CPO system 200. In general, if there is an unwanted rotation of polarization between the PSR 214 and the PSR 206, then optical power is dumped into the optical path of the laser source 204, which can lead to instability (e.g., side mode suppression ratio) or increased noise (e.g., relative intensity noise). However, the effects can be prevented by including an isolator on the optical path between the laser source 204 and the PSR 206. Thus, in some implementations, the CPO system 200 includes an isolator on the optical path between the laser source 204 and the PSR 206. In some implementations, the isolator serves to at least partially isolate the laser source 204 from a portion of a modulated optical signal that has a particular polarization (e.g., the TE polarization). Notably, isolators are commonly used in some applications (e.g., in a single mode datacenter/HPC links) to avoid instability due to reflections, and feedback, and so addition of the isolator may not increase cost or complexity of the CPO system 200. Further, while quantum well lasers are sensitive to back reflection and can cause relative intensity noise to increase or can cause the laser to became unstable, quantum dot lasers (QDLs) are robust against back reflections. In some implementations, QDLs can be used to avoid a need for an isolator in the CPO system 200.

Additionally, the addition of optical components (e.g., one or more PSRs 206 and one or more PSRs 214) to the CPO system 200 may introduce insertion losses to an overall link budget. However, by bringing fiber directly out of the laser source 204, at least one optical fiber connector and breakout cable inside the chassis is removed, which at least partially offsets the insertion loss penalty while reducing cost, improving shoreline density, and improving faceplate bandwidth density. In some implementations, to alleviate losses caused by addition of optical components to the Tx 216, the CPO system 200 may include an optical amplifier (e.g., a semiconductor optical amplifier (SOA)).

Figure 8A:
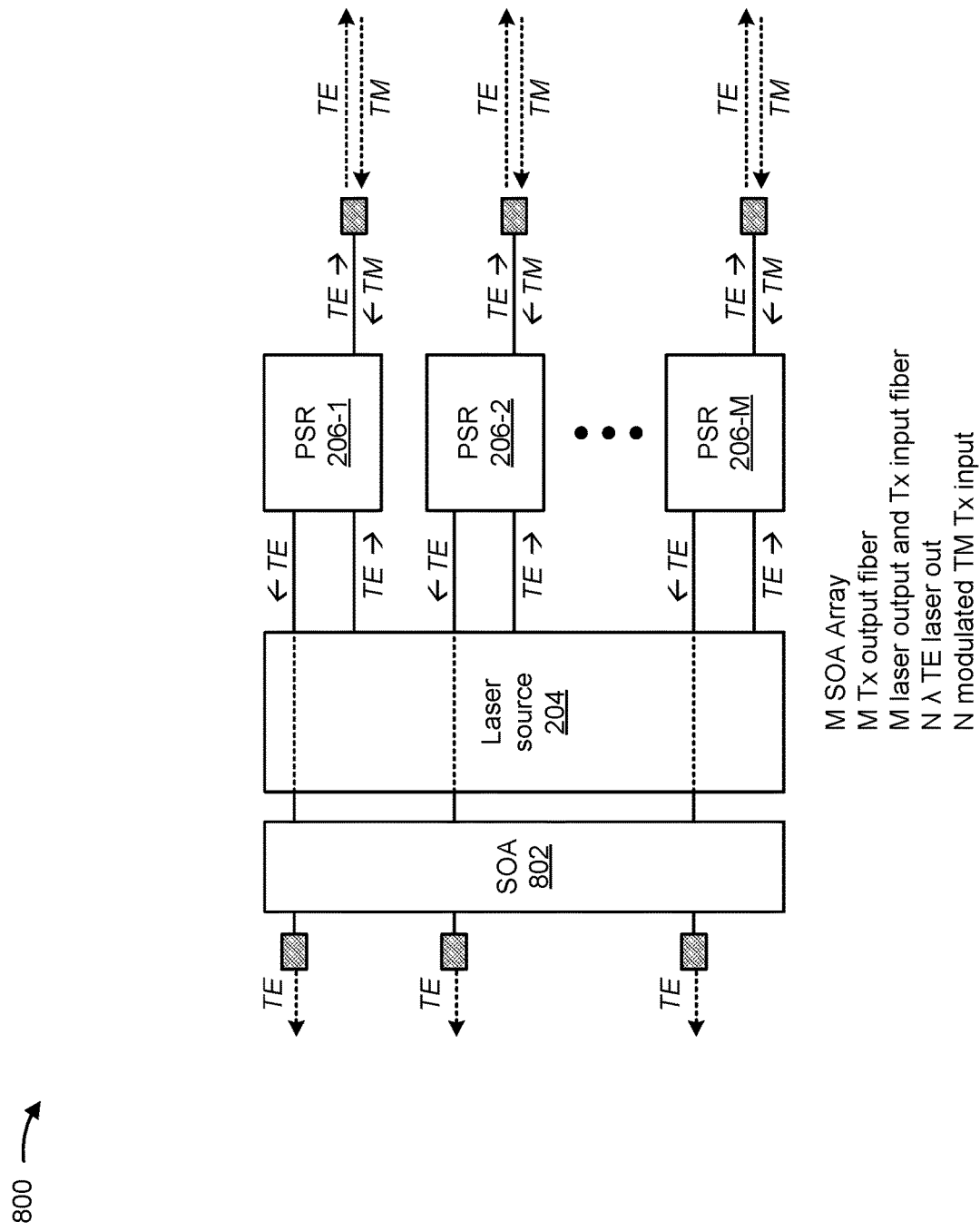
FIGS. 8A and 8B are diagrams illustrating example implementations of a CPO system including a semiconductor optical amplifier.
Figure 8B:
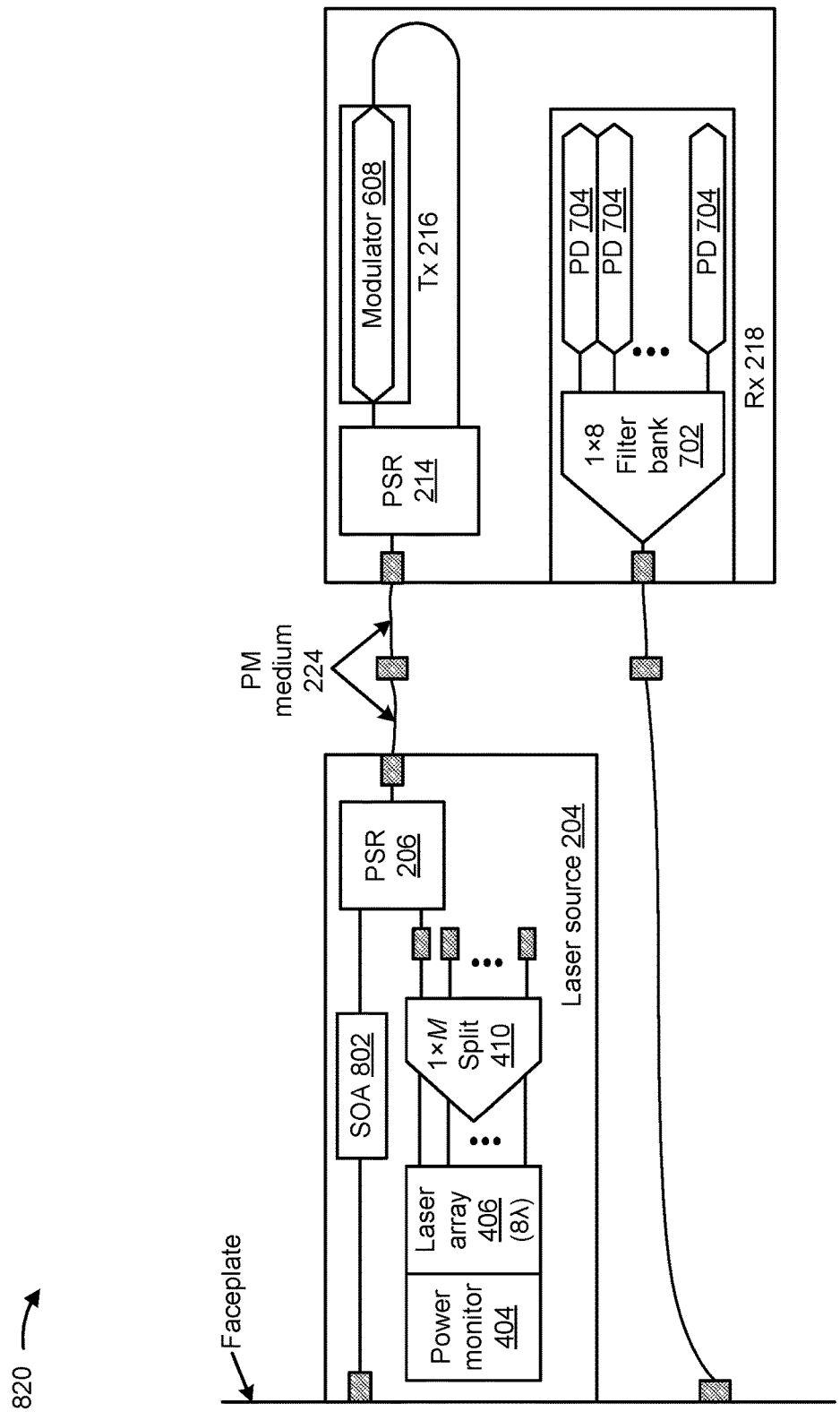

FIGS. 8A and 8B are diagrams illustrating example implementations 800 and 820, respectively, of a CPO system 200 including an SOA 802. In some implementations, as shown in FIGS. 8A and 8B, the SOA 802 may be on an optical path between a PSR 206 and an output of the CPO system 200 (e.g., between the PSR 206 and a Tx output fiber). In some implementations, the SOA 802 may include an array of SOAs (e.g., M SOAs), each associated with one of M Tx 216 outputs. In some implementations, the SOA 802 serves to amplify an output signal provided by the PSR 206. In some implementations, the SOA 802 enables limitations on transmit output power to be overcome and/or reduces overall power consumption when, for example, the Tx 216 becomes nonlinear at high input power (e.g., when the Tx 216 includes micro-ring or resonant modulators), or when additional SOA power is less than additional power needed for all WDM lasers to increase their output power. In some implementations, the use of the SOA 802 enables a variety of implementations, such as high bandwidth MZ modulators with heavy-doped silicon photonic p-n junctions and metal-oxide-semiconductor capacitors (MOSCAPs), or heavy-doped ring modulators in which a transmitter PIC is lossy, to reduce power consumption. In such scenarios, the SOA 802 may serve to enable an increased data rate without increasing power consumption. In some implementations, the CPO system 200 may include an isolator after the SOA 802.

As indicated above, FIGS. 8A and 8B is provided as examples. Other examples may differ from what is described with regard to FIGS. 8A and 8B.

FIG. 9 is a flowchart of an example process 900 associated with a CPO system 200 described herein. In some implementations, one or more process blocks of FIG. 9 are performed by one or more components of the CPO system 200, such as PSR 206 or PSR 214, as described below.

As shown in FIG. 9, process 900 may include receiving TE polarized light at a first port of a first polarization splitter rotator (PSR) (block 905). For example, a first PSR (e.g., the PSR 206) may receive TE polarized light at a first port of the first PSR, as described above.

As further shown in FIG. 9, process 900 may include providing the TE polarized light at a second port of the first PSR (block 910). For example, the first PSR may provide the TE polarized light at a second port of the first PSR, as described above.

As further shown in FIG. 9, process 900 may include receiving the TE polarized light at a fifth port of a second PSR, the TE polarized light being received via a polarization maintaining medium on an optical path between the first PSR and the second PSR (block 915). For example, a second PSR (e.g., a PSR 214) may receive the TE polarized light at a fifth port of the second PSR, the TE polarized light being received via a polarization maintaining medium (e.g., PM medium 224) on an optical path between the first PSR and the second PSR, as described above.

As further shown in FIG. 9, process 900 may include providing the TE polarized light at a sixth port of the second PSR (block 920). For example, the second PSR may provide the TE polarized light at a sixth port of the second PSR, as described above.

As further shown in FIG. 9, process 900 may include receiving modulated TE polarized light at a fourth port of the second PSR (block 925). For example, the second PSR may receive modulated TE polarized light at a fourth port of the second PSR, as described above.

As further shown in FIG. 9, process 900 may include rotating a polarization of the modulated TE polarized light to create modulated TM polarized light (block 930). For example, the second PSR may rotate a polarization of the modulated TE polarized light to create modulated TM polarized light, as described above.

As further shown in FIG. 9, process 900 may include providing the modulated TM polarized light at the fifth port of the second PSR (block 935). For example, the second PSR may provide the modulated TM polarized light at the fifth port of the second PSR, as described above.

As further shown in FIG. 9, process 900 may include receiving the modulated TM polarized light at the second port of the first PSR, the modulated TM polarized light being received via the polarization maintaining medium on the optical path between the first PSR and the second PSR (block 940). For example, the first PSR may receive the modulated TM polarized light at the second port of the first PSR, the modulated TM polarized light being received via the polarization maintaining medium on the optical path between the first PSR and the second PSR, as described above.

As further shown in FIG. 9, process 900 may include rotating a polarization of the modulated TM polarized light to create a TE polarized output signal (block 945). For example, the first PSR may rotate a polarization of the modulated TM polarized light to create a TE polarized output signal, as described above.

As further shown in FIG. 9, process 900 may include providing the TE polarized output signal at a third port of the first PSR (block 950). For example, the first PSR may provide the TE polarized output signal at a third port of the first PSR, as described above.

Process 900 may include additional implementations, such as any single implementation or any combination of implementations described below and/or in connection with one or more other processes described elsewhere herein.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. For example, while some implementations described herein are described in the context of a CPO system that transmits a TE polarized output created from a TM polarized modulated optical signal, with the TM polarized modulated optical signal being generated from a TE polarized optical signal provided by a laser source, other implementations are possible. For example, the use of TE polarized light and TM polarized light may be swapped in some CPO systems. That is, a CPO system may be configured to transmit a TM polarized output created from a TE polarized modulated optical signal, with the TE polarized modulated optical signal being generated from a TM polarized optical signal provided by a laser source. Put another way, the use of TE polarized light and TM polarized light may be reversed in some CPO systems (as compared to examples described herein) without a loss of functionality. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A co-packaged optics system, comprising:
a laser source including a laser source output port;
an electro-optic (EO) transmitter (Tx) including a Tx input port and a Tx output port;
a first polarization splitter rotator (PSR) including a first port, a second port, and a third port;
a second PSR including a fourth port, a fifth port, and a sixth port; and
a polarization maintaining medium on an optical path between the second port of the first PSR and the fifth port of the second PSR,
wherein the laser source output port is optically terminated at the first port of the first PSR,
wherein the second port of the first PSR is optically terminated at the fifth port of the second PSR,
wherein the third port of the first PSR is optically terminated at an output of the co-packaged optics system,
wherein the Tx output port is optically terminated at the fourth port of the second PSR,
wherein the fifth port of the second PSR is optically terminated at the second port of the first PSR, and
wherein the sixth port of the second PSR is optically terminated at the Tx input port.

2. The co-packaged optics system of claim 1, further comprising an optical amplifier on an optical path between the third port of the first PSR and the output of the co-packaged optics system.

3. The co-packaged optics system of claim 1, further comprising an isolator on an optical path between the laser source output port and the first port of the first PSR.

4. The co-packaged optics system of claim 1, further comprising an opto-electric (OE) receiver (Rx), wherein the EO Tx and the OE Rx are included in a multi-chip module (MCM).

5. The co-packaged optics system of claim 1, wherein the laser source includes one of a single wavelength continuous wave (CW) laser source, a multi-wavelength single output CW laser source, or a multi-wavelength multi-output CW laser source.

6. The co-packaged optics system of claim 1, wherein the EO Tx comprises a demultiplexer at the Tx input port, a multiplexer at the Tx output port, and a set of modulators on an optical path between the demultiplexer and the multiplexer.

7. The co-packaged optics system of claim 1, wherein the EO Tx comprises a ring-resonator-based modulator bank or a Mach-Zehnder modulator bank on an optical path between the Tx input port and the Tx output port.

8. An optical system, comprising:
 a laser source to provide an optical signal having a first polarization; and
 a first polarization element to:
  receive the optical signal from the laser source and provide the optical signal to a second polarization element via a polarization maintaining medium,
  receive a second modulated optical signal from the second polarization element via the polarization maintaining medium, the second modulated optical signal having a second polarization,
  manipulate a polarization of the second modulated optical signal to create an output signal having the first polarization,
  provide the output signal to an output of the optical system; and
 the second polarization element to:
  receive the optical signal from the first polarization element via the polarization maintaining medium and provide the optical signal to a transmitter,
  receive a first modulated optical signal from the transmitter, the first modulated optical signal having the first polarization,
  manipulate a polarization of the first modulated optical signal to create the second modulated optical signal, and
  provide the second modulated optical signal to the first polarization element via the polarization maintaining medium.

9. The optical system of claim 8, further comprising an optical amplifier to an amplify the output signal provided by the first polarization element.

10. The optical system of claim 8, further comprising an isolator to at least partially isolate the laser source from a portion of the second modulated optical signal having the first polarization.

11. The optical system of claim 8, further comprising a receiver to convert an input optical signal to an electrical signal, wherein the transmitter and the receiver are included in a multi-chip module (MCM).

12. The optical system of claim 8, wherein the laser source includes one of a single wavelength continuous wave (CW) laser source, a multi-wavelength single output CW laser source, or a multi-wavelength multi-output CW laser source.

13. The optical system of claim 8, wherein the transmitter is to:
 receive the optical signal provided by the second polarization element;
 modulate the optical signal to create the first modulated optical signal; and
 provide the first modulated optical signal to the second polarization element.

14. The optical system of claim 8, wherein the first polarization and the second polarization are mutually-orthogonal states of optical polarization.

15. A laser module, comprising:
 a laser source; and
 a polarization element including:
  a first port to receive an optical signal provided by the laser source, the optical signal having a first polarization;
  a second port to provide an output signal having the first polarization;
  a third port to:
   provide the optical signal received at the first port, wherein the optical signal is to be provided to a polarization maintaining medium, and
   receive a modulated optical signal having a second polarization, wherein the optical signal is to be received via the polarization maintaining medium; and
  a set of optical elements to manipulate a polarization of the modulated optical signal received at the third port to create the output signal provided at the second port.

16. The laser module of claim 15, further comprising an optical amplifier on an optical path on which the optical signal is provided by the second port of the polarization element.

17. The laser module of claim 15, further comprising an isolator on an optical path between the laser source and the first port of the polarization element.

18. The laser module of claim 15, wherein the laser source includes one of a single wavelength continuous wave (CW) laser source, a multi-wavelength single output CW laser source, or a multi-wavelength multi-output CW laser source.

19. The laser module of claim 15, wherein the first polarization and the second polarization are mutually-orthogonal states of optical polarization.

20. The laser module of claim 15, wherein the optical signal is provided to an electro-optic (EO) transmitter (Tx) and the modulated optical signal is received from the EO Tx.

* * * * *